July 9, 1940.  G. C. AREY  2,207,212
TUBE FOR PNEUMATIC TIRE CASINGS
Filed March 11, 1935
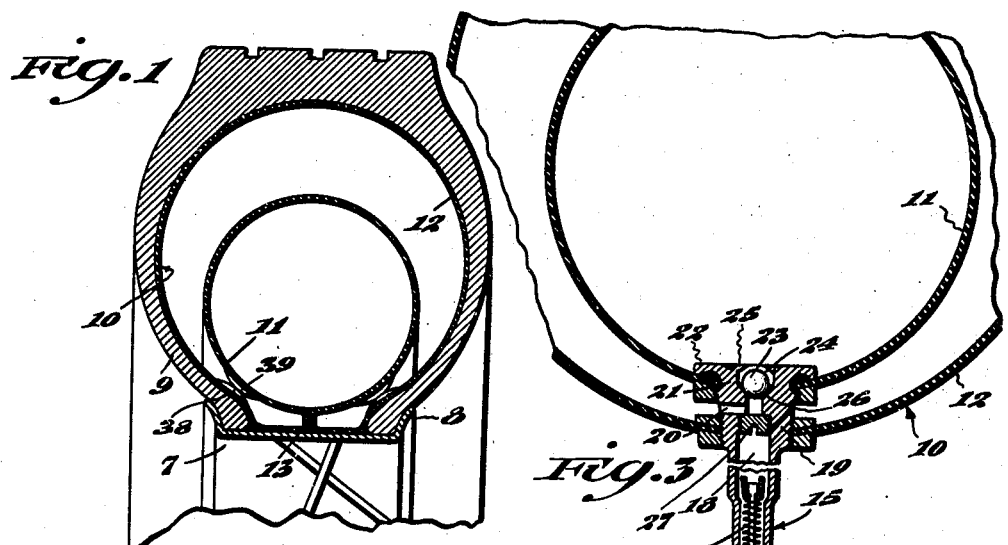
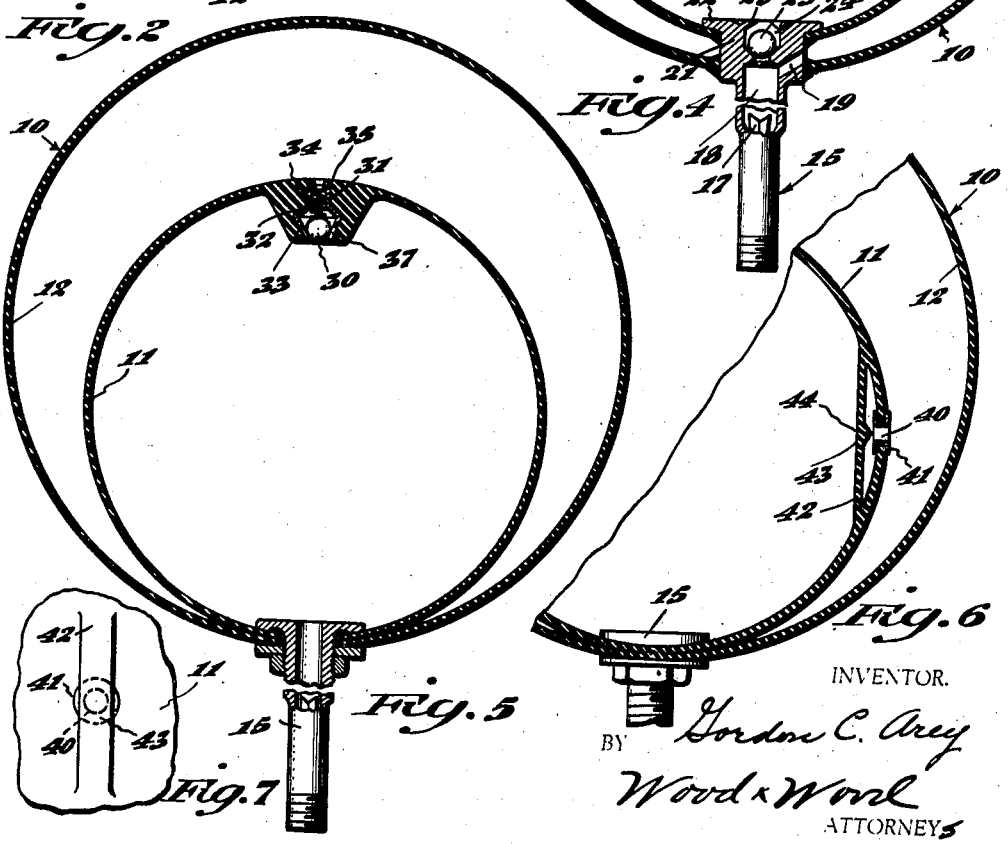
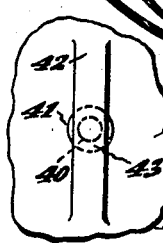
INVENTOR.
Gordon C. Arey
BY Wood & Wood
ATTORNEYS Patented July 9, 1940

2,207,212

UNITED STATES PATENT OFFICE 2,207,212

TUBE FOR PNEUMATIC TIRE CASINGS

Gordon C. Arey, Indian Hill, Ohio

Application March 11, 1935, Serial No. 10,348

11 Claims. (Cl. 152—342)

This invention relates to pneumatic tires and is particularly directed to improvements in the inner tubes conventionally associated therewith. A great many deaths and serious accidents and great inconvenience occur because of "blowouts" or the quick escape of air from the tube as occasioned by sudden breaks in the casings caused by weakness, excessive pressure, nails, or any factor permitting the complete escape of air before the driver can reduce speed or stop. Particularly have these accidents increased since the advent of high speed cars and oversize or balloon tires. These large tires, when collapsed suddenly at high speed, twist very badly and cause entire lack of control.

It is the object of the present invention to provide an improved inner tube construction, incorporating a reserve tube in the nature of a safety tube or secondary defense against blowouts or quick leaks which accomplishes any or all of the following results: first, makes it impossible for sudden complete collapse of the tire to occur; second, supports the casing and car even though the normal inner tube is badly punctured or torn; third, supports the casing at a lowered pressure lessening the chances of damage to the reserve tube because of the factor originally causing the break in the inner tube; fourth, gives the driver warning and time to slow down; fifth, enables the driver to get to a service station in the majority of cases; and sixth, preferably involves a novel integral or one-piece structure for the inner tube and reserve tube.

It is a further object of this invention to provide an improved inner tube of safety construction as above outlined, incorporating an improved valve arrangement, whereby any or all of the following results are achieved: first, the tube may be inflated in the normal way, automatically inflating the reserve tube at the same pressure; second, the air in the respective tubes may be maintained at equal pressures by automatic movement of the valve, which may be initiated by movement of the car; third, the air in the reserve tube is instantly trapped in the event of fairly rapid or sudden drop in pressure in the main tube as caused by a fast leak or blowout, and fourth, voluntary release of air is permitted from both chambers without difficulty or inconvenience, as when the driver wishes to deflate the tire.

The method disclosed herein and certain of the structure is being prosecuted in copending divisional applications, Serial Numbers 247,277 and 247,278, filed Dec. 22, 1938.

The above objects are fulfilled and the invention exemplified in a structure set forth in detail hereinafter, and of the following general nature. The reserve tube is of smaller diameter than the main tube and may be formed therewith or attached thereto at the inner side of the inner circumference thereof. The valve in one form may be compound, including a main valve controlled inlet to the outer or normal tube and a valve controlled passageway from the normal tube to the safety or reserve tube. These valves in these passageways open to external pressures and close to internal pressures. The passageway to the reserve tube may lead directly from the main passageway as a branch thereof, if desired. Other valve structure may be used provided the air in the reserve tube is trapped in the event of sudden leakage from the normal tube. For example, there may be a separate valve in the wall of the reserve tube with the main valve stem leading directly into the reserve chamber and the air passing freely to the normal chamber from the reserve chamber during filling because of the factors of slow flow and the type of the valve utilized. A suddenly or moderately suddenly created differential in the pressures will cause the aforesaid trapping of the air contained in the reserve tube, whereupon the valve in the wall of the reserve tube will close. Thus, the reserve tube may enlarge and take the place of the normal tube for supporting the casing, with a proportionate drop in pressure due to the increased cubical content of the reserve tube.

Other objects and further advantages will be more fully apparent from a description of the accompanying drawing, in which:

Figure 1 is a fragmentary transverse sectional view of a tire casing and the improved tube showing the same mounted on a wheel.

Figure 2 is a fragmentary sectional view enlarged out of Figure 1, detailing the seam of the integral tube structure.

Figure 3 is an enlarged cross sectional view of the inner tube detailing the compound valve and the associated reserve tube.

Figure 4 is a view taken similar to Figure 3, but showing a modified form of valve.

Figure 5 is a view taken similar to Figure 3, but showing separate valves, one a main filling valve entering the reserve tube and the other disposed in the wall of the reserve tube and controlling flow from the reserve tube to the normal tube.

Figure 6 is a fragmentary view taken similar to Figure 3 but showing another form of valve in the reserve tube wall.

Figure 7 is a fragmentary internal face view of the reserve tube wall showing the valve of Figure 6.

Referring to the drawing, a conventional wheel structure is shown at 7, the rim thereof at 8 and the tire casing at 9. The tube is generally shown at 10 within the casing 9 and, as preferred, is formed to provide the reserve tube 11 and main tube 12 as one element. This is done by turning in the inner circumferential portion of a large tube to form the reserve tube (see Figure 1), and vulcanizing the abutting portions as at 13 (see Figure 2).

This provides a reserve tube connected to or united with the main tube along its inner periphery. This tube, as formed of high grade rubber, will yield and stretch freely. The outer tube is limited as to its expanded size by the size of the casing which it inflates. The reserve tube will become inflated as the air is delivered through any one of the various valves disclosed to a normal size or diameter considerably less than that of the outer tube. As attached, this smaller diameter reserve tube is offset (see transverse section through the tube) and has its side and outer wall spaced from the outer tube. In other words, there is no intention to place this reserve tube in working position until an emergency arises. However, its elasticity will permit it to expand to the size of the normal tube contacting the same for replacing or taking the load if the outer tube should be punctured.

As shown in Figure 3, the valve stem 15 may be secured in the tube wall by flanges and nuts in the normal manner in which the stem has been secured in a conventional tube. The valve stem 15 may extend, in the region of the seam 13, through the walls of the tube to the reserve tube.

The valve stem 15 has screw threads at its outer end for the attachment of a closure cap thereto. The air is delivered into the stem through the conventional hose, applied in the conventional manner against the end of the stem. A one way air inlet valve 17, of well known make, is screwed into the outer end of the stem. The pasasgeway 18 of the stem proceeds angularly as at 19 into the outer tube. Diametrically opposite thereto a passageway 20 extends radially to the center of the stem and axially to the interior of the reserve tube.

The attached or inner end of the stem is thickened or includes a head 21 for the inclusion of the aforesaid passageways and includes a flange 22 lying against the inner wall of the reserve tube. Any well known method of attaching the stem may be used, of course, providing that entry to the two tubes is afforded.

A valve 23 is loosely contained in an enlarged portion of the axial passageway 24 leading into the reserve tube. Radially inwardly extended tangs or portions 25, deformed from the metal of its stem at the extreme inner end, prevent displacement of the valve from its chamber, but permit free flow of air to the reserve chamber when the valve is unseated. The valve is adapted to seat on a tapered valve seat 26, when moved outwardly by pressure within the reserve tube, but cannot seat against the retaining tangs. A plug 27 is screwed into the main passageway of the stem between the passageway 19 and the passageway 20 and may be conveniently unscrewed upon removal of the control valve 17 in the stem to permit insertion of a tool and unseating of the valve 23 when the air is to be released from the reserve tube.

As shown in the form disclosed in Figure 4, the main passageway 18 of the valve stem may extend directly to the reserve tube with a valve seat 26 formed therein between the reserve tube and the angular passageway 19 leading to the main tube. The valve stem may be vulcanized in place as shown in Figure 4 in accordance with prevailing practice.

Now in either form, the air is free to flow equally to either chamber, that is either the reserve tube or the main tube, although it is believed preferable to cause the air to flow through the outer chamber into the inner or reserve chamber. The tubes are figured as to size and relation to provide the same cubical content for each. The respective passageways and the clearance for the inner valve may be of cross sectional areas providing uniform or equal passageways for uniform flow to the respective chambers.

The valve 23 floats or unseats freely so that even although the pressures in the respective chambers may be unequal immediately after inflation, movement of the car will cause unseating of the valve. By the arrangement shown in Figure 3, the inner chamber cannot become inflated at a higher pressure than the outer chamber since the air must first pass through the outer chamber. Therefore, the valve can bleed air from the outer to the inner chamber until equal pressure exists. Accordingly, this arrangement, considering these two forms, is preferred.

However, if the rate of flow is properly controlled by the size of the passageways, the arrangement of Figure 4 is equally efficient. Also, a third arrangement is available, as shown in Figure 5, if desired.

In this third form, the valve stem is of conventional structure, that is, encloses the single conventional inlet valve 17. This stem is secured through the tube walls at the seam so that its passageway enters the reserve chamber only. There is no space between the tube walls immediately adjacent the seam, the walls separating gradually due to the different diameters of the tubes. In the opposite or outer wall of the reserve tube, a valve 30 is mounted. The tube wall is thickened and molded about a sleeve element 31. This sleeve includes two adjacent tapered seats 32 and 33. A very light coil spring 34, having a footing on an internal abutment flange 35 at the outer end of the stem, holds the valve against the inner seat, which seat is only an abutment since the seating taper of the valve is longitudinally slotted as at 37 permitting flow of air past the valve even when seated.

Thus when air flows into the reserve tube at the normal delivery rate the valve will not seat on the outer seat 32 but will permit the air to flow into the outer tube until the proper pressure is reached in both tubes. Sudden relief of pressure in the outer tube will cause the valve 30 to operate relative to the passageway or port for restraining the air in the reserve tube under the influence of the normal reserve pressure of the reserve tube. This port is of an effective cross-sectional area at least substantially as great as that of the valve mechanism in the valve stem through which the tube is inflated.

It will be understood that the reserve tube wall may be of a thickness and elasticity permitting expansion when the emergency occurs. At the same time it will be sufficiently rigid to normally retain the size shown when air also enters the main chamber.

As shown in Figures 6 and 7, another form of valve is provided which is highly efficient and will not get out of order. It is of great importance that this valve, in the reserve tube wall, requires no attention since it is inaccessible. A port 40 is provided in the wall of the reserve tube. This port may have a thickened margin for valve seating and toughening purposes or may include an eyelet 41 as shown for this purpose.

A strip 42 of rubber, formed integrally or vulcanized to the reserve tube wall, is disposed across this port on the inside of the reserve tube. This strip, since it is straight, is not in contact with the normally curved tube wall. A valve portion 43 of the strip in the form of a conical teat 44 extends outwardly adjacent the port and in axial alignment therewith.

Now as shown with the tubes inflated, this teat is not seated nor will it seat as air is admitted to the reserve chamber and through the port into the normal chamber in filling the tube. However, when the pressure drops abruptly in the outer chamber, the standing pressure within the reserve chamber presses the elastic strip 42 outwardly and seats the valve sealing the inner chamber.

This pressure sealing the reserve chamber will be aided by the changing curvature of the reserve tube wall as it expands since the teat of the elastic strip will be moved closer to the wall of the reserve tube. This occurs since the curvature of the wall becomes less. Now it will also be evident that the normal elasticity of the strip tending to keep it straight will resist flexing of the strip under inside pressure during filling. In other words, the built up pressure, suddenly relieved through the port when there is a puncture, quickly sets the valve, and the changing curvature of the reserve tube wall tends to aid in keeping it seated.

In Figure 1 the reserve tube is illustrated in contact, as at 38, with the sides of the outer or main tube. This seating of the reserve tube prevents swaying thereof within the main tube which may well occur since the pressures in these tubes normally are equal. Also, the tube walls may be thickened at intervals around their circumferences to provide points of contact, as indicated at 39, whereby the tubes will not become worn through their respective walls in the event of relative movement causing rubbing. The air is free to pass between the spaced thickened portion.

Having described my invention, I claim:

1. A rubber tube structure adapted to be disposed within a tire casing, comprising, an inner tube and an outer tube, said inner tube being of considerably smaller diameter than the outer tube and joined to the peripheral wall thereof, a valve stem secured through the walls of the respective tubes for delivering air to the inner tube, valve means in said stem closing to internal air pressure but opening to external air pressure, said inner tube including a port in its wall, a rubber valve strip stretched across said port on the inner side of said inner tube and attached at its ends to the wall thereof, said strip normally disposed in straight condition, and spaced from the port when the inner tube is in normal position but constructed and arranged so as to restrict the flow of air therethrough immediately upon the loss of air from the outer tube and responsive to sudden flow of air through the port.

2. A rubber tube structure adapted to be disposed within a tire casing, comprising, an inner tube and an outer tube, said inner tube being of smaller diameter than the outer tube and joined to the peripheral wall thereof, a valve stem secured through the walls of the respective tubes for delivering air to the inner tube, valve means in said stem closing to internal air pressure but opening to external air pressure, said inner tube including a port in its wall, a rubber strip stretched across said port on the inner side of said inner tube and attached at its ends to the wall thereof, said strip normally disposed in straight condition, a teat on said strip immediately adjacent to said port normally spaced therefrom when the inner tube is in normal position but adapted to contact and close said port when said inner tube expands beyond its normal size due to relative movement of the strip and adjacent tube wall bringing the teat and port closer together when the tube wall is of lesser curvature.

3. An improved inner tube for use in a pneumatic tire casing, comprising, a main tube and a reserve tube disposed within said main tube, valve means for controlling the delivery of air to the improved inner tube, valve means for controlling the flow of air between said reserve tube and said main tube, said reserve tube being of smaller diameter than said main tube and attached thereto along the inside of the inner wall of said main tube, said latter valve means adapted to close immediately upon sudden loss of air from the main tube, whereupon said reserve tube is free to expand outwardly and engage the wall of the main tube, said latter valve means disposed in the side wall of the reserve tube where it will not be closed by contact of the tread surfaces of the reserve tube and main tube.

4. An improved inner tube for use in a pneumatic tire casing, comprising: a main tube, a reserve tube contained within the main tube and of smaller diameter than said main tube, said tubes joined along their rim adjacent portions, a valve stem attached to the inner tube and entering the reserve tube, a valve in said stem closing to internal pressure but opening to external pressure, said reserve tube having a port in its wall providing for free circulation of air between said tubes and the passage of air from the reserve tube to the main tube as fast as the air enters the reserve tube, and a valve controlling the port, said valve normally standing open and unaffected by the passage of air as the tube is inflated or deflated, said valve constructed and arranged so as to restrict the flow of air therethrough immediately upon the loss of air from the main tube and responsive to sudden flow of air through the port.

5. An inner tube for pneumatic tires, said inner tube comprising two tubes, one located within the other, said tubes attached together at the walls thereof adjacent the rim, a valve mechanism for admitting air into the inner one of said two tubes, a port in the inner one of said tubes for admitting air to the surrounding tube, said port having an effective cross sectional area at least substantially as great as that of the valve mechanism by which air is admitted to the inner one of said tubes, a valve member disposed within the inner one of said tubes, said valve member tensionally positioned just out of contact with said port and adapted to remain out of contact when the tire is being inflated or deflated, but adapted to block said port responsively to sudden flow of air through the port to trap the air within the inner one of said tubes.

6. An inner tube for pneumatic tires, said inner tube comprising two tubes, one located within the other, said tubes attached together at the walls thereof adjacent the rim, a valve mechanism for admitting air into the inner one of said two tubes, a port in the inner one of said tubes for admitting air to the surrounding tube, said port having an effective cross sectional area at least substantially as great as that of the valve mechanism by which air is admitted to the inner one of said tubes, a valve member disposed within the inner one of said tubes, said valve member being constructed and arranged so as to remain open when the tire is being inflated and deflated but adapted to control said port responsively to a sudden flow of air through said port to restrain the air within the inner one of said tubes.

7. An inner tube for pneumatic tires, said inner tube comprising two tubular chambers one located within the other, said tubular chambers coinciding at the bases thereof, a valve mechanism for admitting air into the inner one of said two chambers, a passage between the chambers, said passage having an effective cross-sectional area at least substantially as great as that of the valve mechanism by which air is admitted to the inner one of said chambers, and a valve member associated with said passage, said valve member being constructed and arranged so as to remain open during normal deflation and inflation but adapted to control said passage responsively to a sudden flow of air through said passage to restrict the air within the inner one of said chambers.

8. An inner tube for pneumatic tires, said inner tube comprising two tubular chambers one located within the other, said tubular chambers coinciding at the bases thereof, a valve mechanism for admitting air into one of said two chambers, a passage between the chambers, said passage having an effective cross-sectional area at least substantially as great as that of the valve mechanism by which air is admitted to the said one of said chambers, and valving means associated with said passage, said valving means being constructed and arranged so as to remain open during normal deflation and inflation but adapted to control said passage responsively to a sudden flow of air through said passage to restrict the air within the inner one of said chambers.

9. An inner tube for pneumatic tires, said inner tube comprising two tubular chambers one located within the other, said tubular chambers being attached adjacent the rim-engaging portions thereof, a valve for admitting air into one of said tubular chambers, a port in the wall of the inner one of said tubular chambers affording free circulation of air between said chambers, said port having an effective cross-sectional area at least substantially as great as that of the valve by which air is admitted to the said one of said chambers, a rubber valve member associated with said port and adapted to remain open when the tire is being inflated or deflated, but adapted to close said port responsively to sudden flow of air through said port to restrict the air within the said one of said tubular chambers.

10. An inner tube for pneumatic tires, said inner tube comprising two annular tubes, said tubes arranged one within the other and connected to each other along their circumferences, those portions of the tube walls which are disposed radially inward being adjacent and those portions which are disposed radially outward being spaced apart when the tube is inflated, a valve mechanism for admitting air into one of said two tubes, a passage between the tubes, said passage having an effective cross-sectional area at least substantially as great as that of the valve mechanism by which air is admitted to the said one of said tubes, and valving means associated with said passage, said valving means being constructed and arranged so as to remain open during normal deflation and inflation but adapted to control said passage responsively to a sudden flow of air through said passage to restrict the air within the inner one of said tubes.

11. An inner tube for pneumatic tires, said inner tube comprising two tubular chambers, said tubular chambers arranged one within the other and connected to each other along their circumferences, said tubular chambers coinciding at the bases thereof, a valve mechanism for admitting air into one of said two chambers, a passage between the chambers, said passage having an effective cross-sectional area at least substantially as great as that of the valve mechanism by which air is admitted to the said one of said chambers, and valving means associated with said passage, said valving means comprising a seat element mounted in the wall of the chamber and including said passage, a ball valve disposed adjacent said seat element, and means holding said valve in open position during normal deflation and inflation and said valve being adapted to engage said seat element responsively to a sudden flow of air through said passage to restrict the air within the inner one of said chambers.

GORDON C. AREY.